(12) United States Patent
Ritchie

(10) Patent No.: US 12,434,989 B2
(45) Date of Patent: Oct. 7, 2025

(54) SEPTIC SLUDGE ALARM ASSEMBLY

(71) Applicant: Joshua Ritchie, Skiff Lake (CA)

(72) Inventor: Joshua Ritchie, Skiff Lake (CA)

( * ) Notice: Subject to any disclaimer, the term of this patent is extended or adjusted under 35 U.S.C. 154(b) by 451 days.

(21) Appl. No.: 17/983,169

(22) Filed: Nov. 8, 2022

(65) Prior Publication Data

US 2024/0150207 A1   May 9, 2024

(51) Int. Cl.
*C02F 3/28* (2023.01)
*G01F 23/00* (2022.01)

(52) U.S. Cl.
CPC ........ *C02F 3/2866* (2013.01); *G01F 23/0007* (2013.01); *C02F 3/28* (2013.01); *C02F 2209/40* (2013.01); *C02F 2209/42* (2013.01)

(58) Field of Classification Search
CPC ...... C02F 3/2866; C02F 3/28; C02F 2209/40; C02F 2209/42; G01F 23/0007
USPC ..................................... 210/87, 532.1, 532.2
See application file for complete search history.

(56) References Cited

U.S. PATENT DOCUMENTS

| | | | |
|---|---|---|---|
| 3,460,675 A * | 8/1969 | Hicks | C02F 3/006 210/93 |
| 4,319,998 A * | 3/1982 | Anderson | C02F 3/006 210/170.08 |
| 4,439,323 A * | 3/1984 | Ball | B01D 35/0276 210/744 |
| 4,546,346 A | 10/1985 | Wave | |
| 5,006,833 A | 4/1991 | Marlowe | |
| 5,427,679 A * | 6/1995 | Daniels | B01D 29/23 210/485 |
| 5,687,761 A | 11/1997 | Langes | |
| 6,217,752 B1 | 4/2001 | Coots | |
| D492,000 S | 6/2004 | Festa | |
| 7,336,190 B2 | 2/2008 | Giordano, Jr. | |
| 9,464,987 B2 | 10/2016 | Gillespie | |
| 2017/0275193 A1* | 9/2017 | Graves | C02F 9/00 |
| 2019/0160396 A1* | 5/2019 | Presby | B01D 21/2488 |

FOREIGN PATENT DOCUMENTS

CN      111364598 A  *  7/2020

OTHER PUBLICATIONS

Machine-generated English translation of CN 111364598, generated on Mar. 30, 2025.*

* cited by examiner

*Primary Examiner* — Fred Prince

(57) ABSTRACT

A septic sludge alarm assembly includes a vault buried beneath ground thereby facilitating the vault to be aligned with a septic tank. A sludge trap is positioned within the vault. The sludge trap has an inlet fluidly coupled to a septic tank and an outlet fluidly coupled to a leach field supply. The sludge trap has a lower section facilitating liquid flowing into the inlet to flow downwardly into the lower section. The sludge trap has an upper section inhibiting the liquid from flowing upwardly into the upper section. The sludge trap urges the fluid to flow upwardly into the upper section when the lower section becomes sufficiently filled with sludge. A flow alarm is actuated when the sludge trap urges the fluid to flow upwardly into the upper section thereby facilitating the alert to be alerted that the septic tank needs to be emptied.

11 Claims, 3 Drawing Sheets

SEPTIC SLUDGE ALARM ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to septic alarm devices and more particularly pertains to a vault buried beneath ground thereby facilitating the vault to be aligned with a septic tank. A sludge trap is positioned within the vault. The sludge trap has an inlet fluidly coupled to a septic tank and an outlet fluidly coupled to a leach field supply. The sludge trap has a lower section facilitating liquid flowing into the inlet to flow downwardly into the lower section. The sludge trap has an upper section inhibiting the liquid from flowing upwardly into the upper section. The sludge trap urges the fluid to flow upwardly into the upper section when the lower section becomes sufficiently filled with sludge. A flow alarm is actuated when the sludge trap urges the fluid to flow upwardly into the upper section thereby facilitating the alert to be alerted that the septic tank needs to be emptied.

(2) Description of Related Art Including Information Disclosed Under 37 CFR 1.97 and 1.98

The prior art relates to septic alarm devices including a sewer line backup detecting device that includes an alarm installed in a cleanout cap of a sewer line. The prior art discloses a restricted flow alert that comprises flow sensor in a sewage line and an alarm that is actuated when the flow sensor senses restricted flow in the sewage line. The prior art discloses a sewer cleanout device which includes a float installed in a sewer cleanout and a piston disposed in the cleanout which is lifted by the float when sewage flows into the sewer cleanout. The prior art discloses a septic tank level sensor that includes a pair of fluid sensors each attached to a member extending into a septic tank for sensing respective levels of sewage in the septic tank. The prior art discloses septic tank alert that includes a sewage pipe with a vent located adjacent to a sewage trap and a sensor in the vent for producing an alert when the sensor senses sewage in the vent. The prior art discloses a sludge monitor that includes a light emitting diode positioned within a septic tank and a dark sensor photo cell.

BRIEF SUMMARY OF THE INVENTION

An embodiment of the disclosure meets the needs presented above by generally comprising a vault buried beneath ground thereby facilitating the vault to be aligned with a septic tank. A sludge trap is positioned within the vault. The sludge trap has an inlet fluidly coupled to a septic tank and an outlet fluidly coupled to a leach field supply. The sludge trap has a lower section facilitating liquid flowing into the inlet to flow downwardly into the lower section. The sludge trap has an upper section inhibiting the liquid from flowing upwardly into the upper section. The sludge trap urges the fluid to flow upwardly into the upper section when the lower section becomes sufficiently filled with sludge. A flow alarm is actuated when the sludge trap urges the fluid to flow upwardly into the upper section thereby facilitating the alert to be alerted that the septic tank needs to be emptied.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
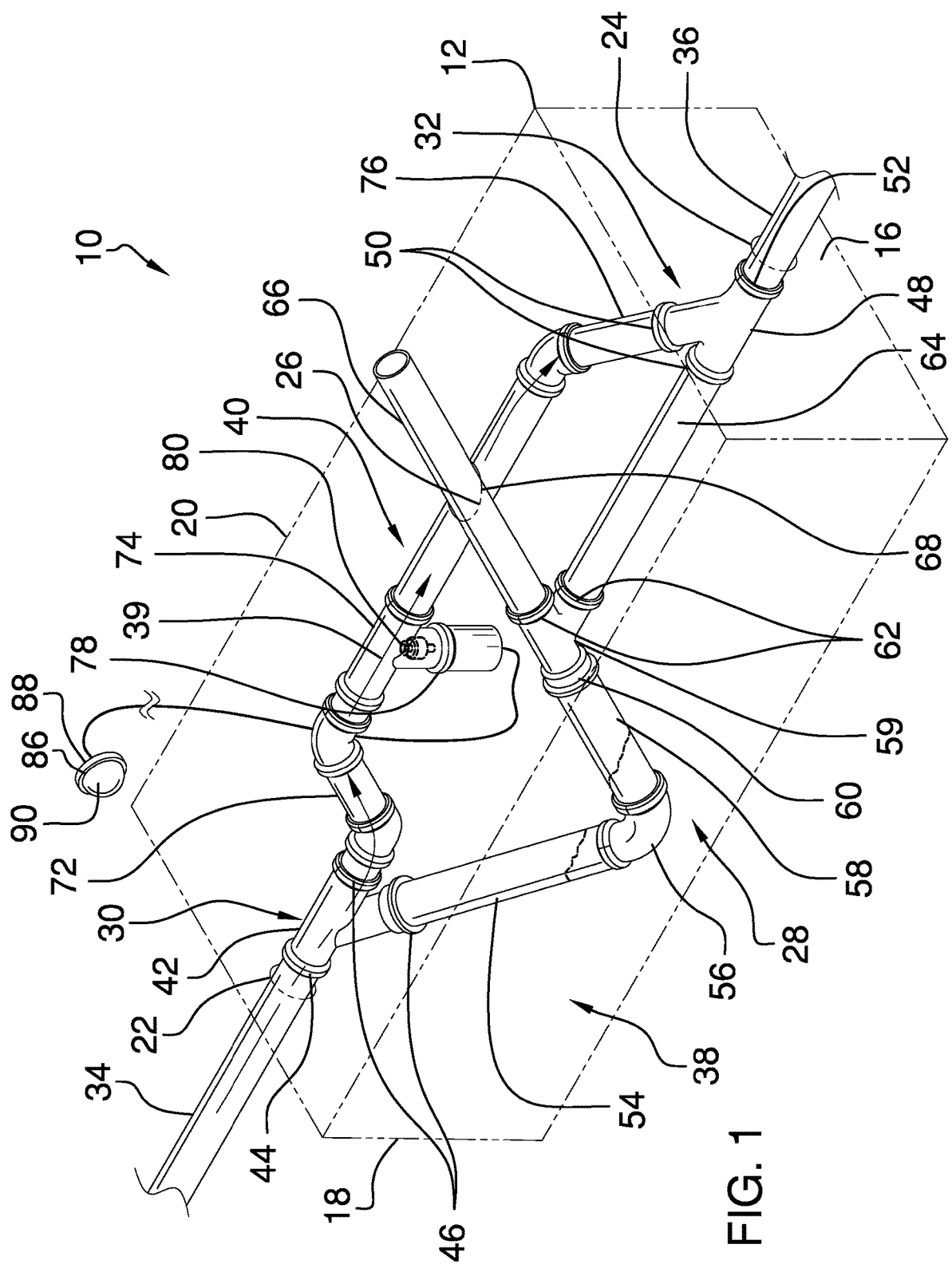
FIG. 1 is a perspective phantom view of a septic sludge alarm assembly according to an embodiment of the disclosure.
Figure 2:
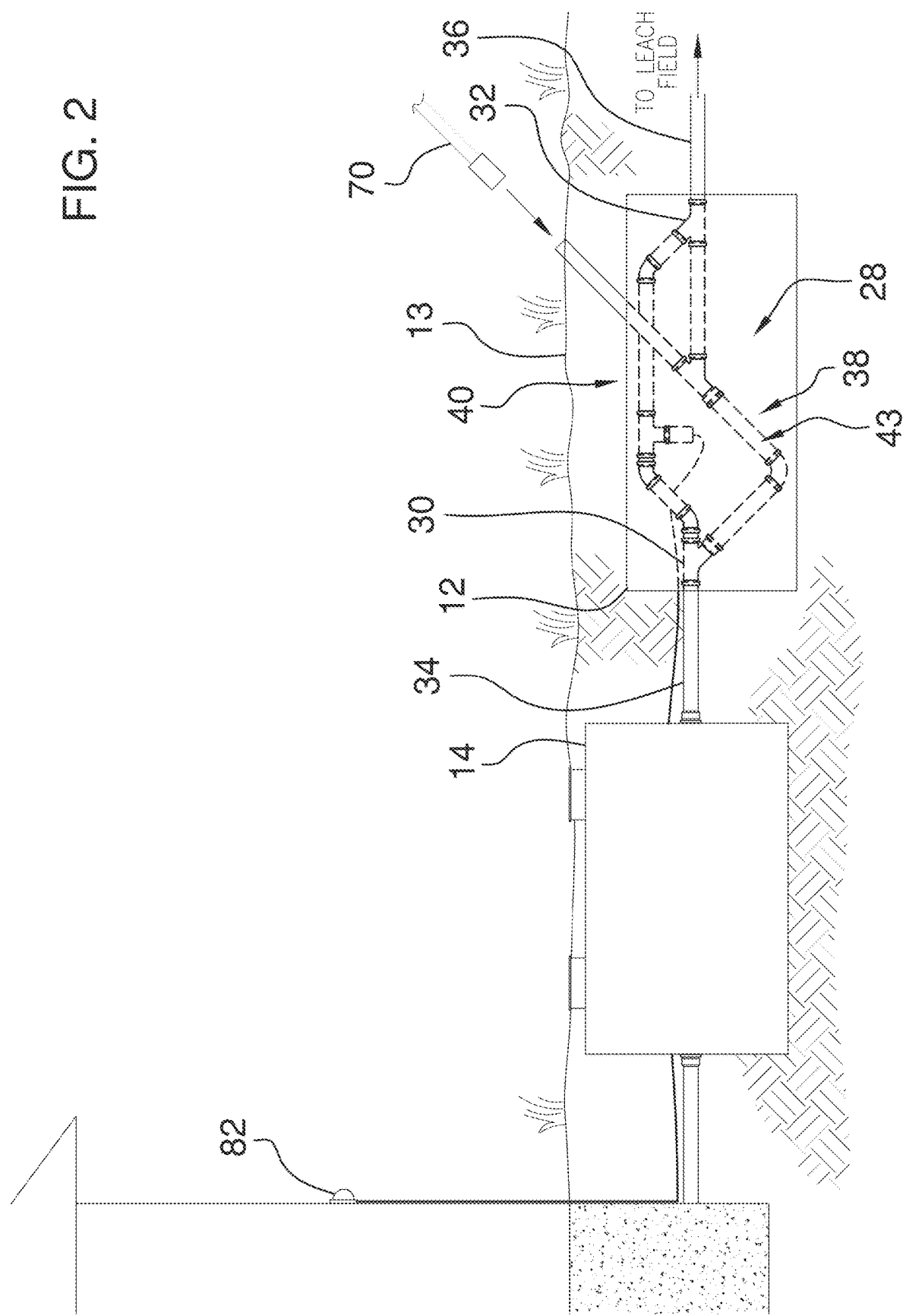
FIG. 2 is a perspective view of an embodiment of the disclosure.
Figure 3:
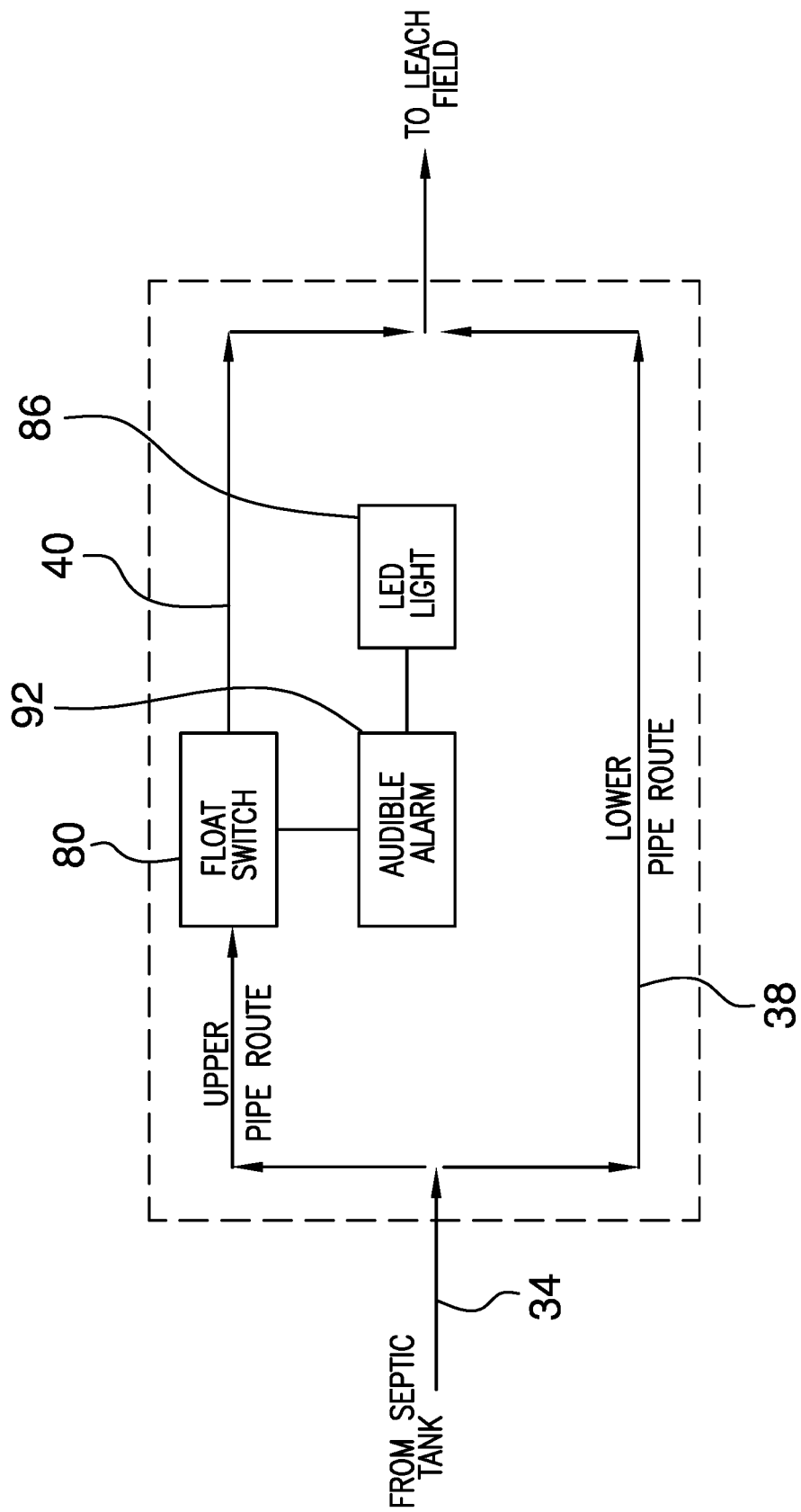
FIG. 3 is a schematic view of an embodiment of the disclosure.

With reference now to the drawings, and in particular to FIGS. 1 through 3 thereof, a new septic alarm device embodying the principles and concepts of an embodiment of the disclosure and generally designated by the reference numeral 10 will be described.

As best illustrated in FIGS. 1 through 3, the septic sludge alarm assembly 10 generally comprises a vault 12 that is buried beneath ground 13 thereby facilitating the vault 12 to be aligned with a septic tank 14. The septic tank 14 may be septic tank of a residence, for example, for the collection of sewage. The vault 12 has a front wall 16, a back wall 18 and a top wall 20; the vault 12 has an entry 22 extending through the back wall 18, the vault 12 has an exit 24 extending through the front wall 16 and the vault 12 has a port 26 extending through the top wall 20. The port 26 is aligned with a centerline of the top wall 20 which extends between the front wall 16 and the back wall 18 and the port 26 is positioned closer to the front wall 16 than the back wall 18.

A sludge trap 28 is positioned within the vault 12 and the sludge trap 28 has an inlet 30 that is in fluid communication with an outlet 32. The inlet 30 is fluidly coupled to an output 34 of the septic tank 14 and the outlet 32 is fluidly coupled to a leach field supply 36. The sludge trap 28 has a lower section 38 sequentially angling downwardly and upwardly between the inlet 30 and the outlet 32 thereby facilitating sewage 39 flowing into the inlet 30 to be urged to flow downwardly into the lower section 38. The sludge trap 28 has an upper section 40 sequentially angling upwardly and downwardly between the inlet 30 and the outlet 32 thereby inhibiting the sewage 39 flowing into the inlet 30 to be urged to flow upwardly into the upper section 40. Furthermore, the sludge trap 28 urges the fluid to flow upwardly into the upper section 40 when the lower section 38 becomes sufficiently filled with sludge 43.

The inlet 30 comprises a Y-fitting 42 that has an inlet arm 44 and a pair of outlet arms 46 branching away from the inlet arm 44. The inlet arm 44 is fluidly coupled to the output 34 of the septic tank 14 having the output 34 of the septic tank 14 extending through the entry 22 in the back wall 18 of the vault 12. The outlet 32 comprises a Y-fitting 48 that has a pair of inlet arms 50 branching away from an outlet arm 52. The outlet arm 52 associated with the outlet 32 is fluidly coupled to the leach field supply 36 having the leach field supply 36 extending through the exit 24 in the front wall 16 of the vault 12.

The lower section 38 comprises a first pipe 54 that is fluidly coupled to a respective one of the outlet arms 46 associated with the inlet 30 such that the first pipe 54 angles downwardly from the respective outlet arm 52. The lower section 38 includes an elbow 56 that is fluidly coupled between the first pipe 54 and a second pipe 58 such that the second pipe 58 angles upwardly from the first pipe 54. The lower section 38 includes a Y-fitting 59 that has an input arm 60 and a pair of output arms 62 branching away from the input arm 60 and the second pipe 58 is fluidly coupled to the input arm 60. The lower section 38 includes a third pipe 64 that is fluidly coupled between a respective one of the output arms 62 associated with the lower section 38 and a respective one of the inlet arms 50 associated with the outlet 32.

The lower section 38 includes a pump pipe 66 that is fluidly coupled to a respective one of the output arms 62 associated with the lower section 38 having the pump pipe 66 angling upwardly toward the top wall 20 of the vault 12 and outwardly through the port 26 in the top wall 20. The port 26 has a bounding edge 68 defining a circular shape that is elongated along an axis extending between the front wall 16 and the back wall 18 of the vault 12 such that the port 26 has an ovoid shape. In this way the port 26 facilitates the pump pipe 66 to be angled having the pump pipe 66 extending outwardly through the ground 13 thereby facilitating the pump pipe 66 to be fluidly coupled to a septic truck 70 for emptying the septic tank 14.

The upper section 40 includes a primary pipe 72 that is fluidly coupled to a respective one of the outlet arms 46 associated with the inlet 30 such that the primary pipe 72 angles upwardly from the respective outlet arm 52. The upper section 40 includes a central pipe 74 that is fluidly coupled to the primary pipe 72 such that the central pipe 74 is horizontally oriented. Continuing, the upper section 40 includes a secondary pipe 76 that is fluidly coupled between the central pipe 74 and a respective one of the inlet arms 50 associated with the outlet 32. The central pipe 74 has an alarm cup 78 that is integrated into the central pipe 74.

A flow alarm 80 is integrated into the upper section 40 of the sludge trap 28 thereby facilitating the flow alarm 80 to be actuated when the sludge trap 28 urges the fluid to flow upwardly into the upper section 40. The flow alarm 80 includes an alert 82 that is conspicuously located thereby facilitating the alert 82 to be visible to a user. The alert 82 is turned on when the flow alarm 80 is actuated to alert the user that the septic tank 14 needs to be emptied. Additionally, the flow alarm 80 is positioned in the alarm cup 78 in the central pipe 74 of the upper section 40. The flow alarm 80 is actuated when fluid flows into the alarm cup 78 and the flow alarm 80 is normally de-actuated. The flow alarm 80 may comprise an electronic float sensor or other type of electronic sensor that can sense the presence of water.

A light emitter 86 is provided that has a housing 88 which is mounted in the conspicuous location and a lens 90 that is coupled to the housing 88 such that the lens 90 is exposed. The light emitter 86 emits light through the lens 90 when the light emitter 86 is turned on and the light emitter 86 is electrically coupled to the flow alarm 80 such that the light emitter 86 defines the alert 82. The light emitter 86 is turned on when the flow alarm 80 is actuated and the light emitter 86 is turned off when the flow alarm 80 is de-actuated. The light emitter 86 may comprise a light emitting diode or other type of electronic light emitter. As is most clearly shown in FIG. 3, the alert 82 may include a speaker 92 that is electrically coupled to the flow alarm 80 for emitting an audible alert when the flow alarm 80 is actuated.

In use, the sewage 39 from the septic tank 14 flows through the lower section 38 of the sludge trap 28 under normal conditions to enter the leach field supply 36. Eventually the lower section 38 will become sufficiently filled with sludge 43 such that the sewage 39 can no longer flow adequately through the lower section 38. In this way the sewage 39 will be forced to flow into the upper section 40 of the sludge trap 28 and actuate the flow alert 82. Thus, the light emitter 86 will be turned on to visually alert 82 the user that the septic tank 14 needs to be emptied. In this way the user does not have to guess when the septic tank 14 if full and can ensure that the septic tank 14 is emptied prior to causing damage to the leach field as commonly occurs when septic tanks become overfilled. The septic truck 70 can attach to the pump pipe 66 to empty the septic tank 14 and subsequently de-actuate the flow alert 82.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A septic sludge alarm assembly for emitting an alert when sludge in a septic system reaches a trigger volume for communicating that the septic system needs to be emptied, said assembly comprising:
   a vault being buried beneath ground thereby facilitating said vault to be aligned with a septic tank;
   a sludge trap being positioned within said vault, said sludge trap having an inlet being in fluid communication with an outlet, said inlet being fluidly coupled to an output of the septic tank, said outlet being fluidly coupled to a leach field supply, said sludge trap having a lower section sequentially angling downwardly and upwardly between said inlet and said outlet thereby facilitating liquid flowing into said inlet to be urged to flow downwardly into said lower section, said sludge trap having an upper section sequentially angling upwardly and downwardly between said inlet and said outlet thereby inhibiting the liquid flowing into said inlet to be urged to flow upwardly into said upper section, said sludge trap urging the liquid to flow upwardly into said upper section when said lower section becomes sufficiently filled with sludge; and
   a flow alarm being integrated into said upper section of said sludge trap thereby facilitating said flow alarm to be actuated when said sludge trap urges the liquid to flow upwardly into said upper section, said flow alarm including an alert being conspicuously located thereby facilitating said alert to be visible to a user, said alert being turned on when said flow alarm is actuated wherein said alert is configured to alert the user that the septic tank needs to be emptied.

2. The assembly according to claim 1, further comprising said vault having a front wall, a back wall and a top wall, said vault having an entry extending through said back wall, said vault having an exit extending through said front wall, said vault having a port extending through said top wall, said port having a bounding edge defining a circular shape being elongated along an axis extending between said front wall and said back wall such that said port has an ovoid shape, said port being aligned with a centerline of said top wall which extends between said front wall and said back wall, said port being positioned closer to said front wall than said back wall.

3. The assembly according to claim 2, wherein:
   said inlet comprises a Y-fitting having an inlet arm and a pair of outlet arms branching away from said inlet arm, said inlet arm being fluidly coupled to the output of the septic tank having the output of the septic tank extending through said entry in said back wall of said vault; and
   said outlet comprises a Y-fitting having a pair of inlet arms branching away from an outlet arm, said outlet arm associated with said outlet being fluidly coupled to the leach field supply having the leach field supply extending through said exit in said front wall of said vault.

4. The assembly according to claim 3, wherein:
   said lower section comprises a first pipe being fluidly coupled to a respective one of said outlet arms associated with said inlet such that said first pipe angles downwardly from said respective outlet arm;
   said lower section includes an elbow being fluidly coupled between said first pipe and a second pipe such that said second pipe angles upwardly from said first pipe;
   said lower section includes a Y-fitting having an input arm and a pair of output arms branching away from said input arm, said second pipe being fluidly coupled to said input arm; and
   said lower section includes a third pipe being fluidly coupled between a respective one of said output arms associated with said lower section and a respective one of said inlet arms associated with said outlet.

5. The assembly according to claim 4, wherein said lower section includes a pump pipe being fluidly coupled to a respective one of said output arms associated with said lower section having said pump pipe angling upwardly toward said top wall of said vault and outwardly through said port in said top wall having said pump pipe extending outwardly through the ground thereby facilitating said pump pipe to be fluidly coupled to a pump truck for emptying the septic tank.

6. The assembly according to claim 3, wherein:
   said upper section includes a primary pipe being fluidly coupled to a respective one of said outlet arms associated with said inlet such that said primary pipe angles upwardly from said respective outlet arm;
   said upper section includes a central pipe being fluidly coupled to said primary pipe such that said central pipe is horizontally oriented; and
   said upper section includes a secondary pipe being fluidly coupled between said central pipe and a respective one of said inlet arms associated with said outlet.

7. The assembly according to claim 6, wherein said central pipe has an alarm cup being integrated into said central pipe.

8. The assembly according to claim 7, wherein said flow alarm is positioned in said alarm cup in said central pipe of said upper section, said flow alarm being actuated when fluid flows into said alarm cup, said flow alarm being normally de-actuated.

9. The assembly according to claim 1, further comprising a light emitter having a housing being mounted in the conspicuous location and a lens being coupled to said housing such that said lens is exposed, said light emitter emitting light through said lens when said light emitter is turned on, said light emitter being electrically coupled to said flow alarm such that said light emitter defines said alert, said light emitter being turned on when said flow alarm is actuated, said light emitter being turned off when said flow alarm is de-actuated.

10. A septic sludge alarm assembly for emitting an alert when sludge in a septic system reaches a trigger volume for communicating that the septic system needs to be emptied, said assembly comprising:
   a vault being buried beneath ground thereby facilitating said vault to be aligned with a septic tank, said vault having a front wall, a back wall and a top wall, said vault having an entry extending through said back wall, said vault having an exit extending through said front wall, said vault having a port extending through said top wall, said port being aligned with a centerline of said top wall which extends between said front wall and said back wall, said port being positioned closer to said front wall than said back wall;
   a sludge trap being positioned within said vault, said sludge trap having an inlet being in fluid communication with an outlet, said inlet being fluidly coupled to an output of the septic tank, said outlet being fluidly coupled to a leach field supply, said sludge trap having a lower section sequentially angling downwardly and upwardly between said inlet and said outlet thereby facilitating liquid flowing into said inlet to be urged to flow downwardly into said lower section, said sludge trap having an upper section sequentially angling upwardly and downwardly between said inlet and said outlet thereby inhibiting the liquid flowing into said inlet to be urged to flow upwardly into said upper section, said sludge trap urging the liquid to flow upwardly into said upper section when said lower section becomes sufficiently filled with sludge, said inlet comprising a Y-fitting having an inlet arm and a pair of outlet arms branching away from said inlet arm, said inlet arm being fluidly coupled to the output of the septic tank having the output of the septic tank extending through said entry in said back wall of said vault, said outlet comprising a Y-fitting having a pair of inlet arms branching away from an outlet arm, said outlet arm associated with said outlet being fluidly coupled to the leach field supply having the leach field supply extending through said exit in said front wall of said vault, said lower section comprising a first pipe being fluidly coupled to a respective one of said outlet arms associated with said inlet such that said first pipe angles downwardly from said respective outlet arm, said lower section including an elbow being fluidly coupled between said first pipe and a second pipe such that said second pipe angles upwardly from said first pipe, said lower section including a Y-fitting having an input arm and a pair of output arms branching away from said input arm, said second pipe being fluidly coupled to said input arm, said lower section including a third pipe being fluidly coupled between a respective one of said output arms associated with said lower section and a respective one of said inlet arms associated with said outlet, said lower section including a pump pipe being fluidly coupled to a respective one of said output arms associated with said lower section having said pump pipe angling upwardly toward said top wall of said vault and outwardly through said port in said top wall, said port having a bounding edge defining a circular shape being elongated along an axis extending between said front wall and said back wall of said vault such that said port has an ovoid shape thereby facilitating said pump pipe to be angled having said pump pipe extending outwardly through the ground thereby facilitating said pump pipe to be fluidly coupled to a pump truck for emptying the septic tank, said upper section including a primary pipe being fluidly coupled to a respective one of said outlet arms associated with said inlet such that said primary pipe angles upwardly from said respective outlet arm, said upper section including a central pipe being fluidly coupled to said primary pipe such that said central pipe is horizontally oriented, said upper section including a secondary pipe being fluidly coupled between said central pipe and a respective one of said inlet arms associated with said outlet, said central pipe having an alarm cup being integrated into said central pipe; and a flow alarm being integrated into said upper section of said sludge trap thereby facilitating said flow alarm to be actuated when said sludge trap urges the liquid to flow upwardly into said upper section, said flow alarm including an alert being conspicuously located thereby facilitating said alert to be visible to a user, said alert being turned on when said flow alarm is actuated wherein said alert is configured to alert the user that the septic tank needs to be emptied, said flow alarm being positioned in said alarm cup in said central pipe of said upper section, said flow alarm being actuated when fluid flows into said alarm cup, said flow alarm being normally de-actuated; and a light emitter having a housing being mounted in the conspicuous location and a lens being coupled to said housing such that said lens is exposed, said light emitter emitting light through said lens when said light emitter is turned on, said light emitter being electrically coupled to said flow alarm such that said light emitter defines said alert, said light emitter being turned on when said flow alarm is actuated, said light emitter being turned off when said flow alarm is de-actuated.

11. A septic sludge alarm system for emitting an alert when sludge in a septic system reaches a trigger volume for communicating that the septic system needs to be emptied, said system comprising:

a septic tank being buried underground, said septic tank having output, a leach field supply being buried underground, said leach field having a supply;

a vault being buried beneath ground thereby facilitating said vault to be aligned with a septic tank, said vault having a front wall, a back wall and a top wall, said vault having an entry extending through said back wall, said vault having an exit extending through said front wall, said vault having a port extending through said top wall, said port being aligned with a centerline of said top wall which extends between said front wall and said back wall, said port being positioned closer to said front wall than said back wall;

a sludge trap being positioned within said vault, said sludge trap having an inlet being in fluid communication with an outlet, said inlet being fluidly coupled to an output of the septic tank, said outlet being fluidly coupled to a leach field supply, said sludge trap having a lower section sequentially angling downwardly and upwardly between said inlet and said outlet thereby facilitating liquid flowing into said inlet to be urged to flow downwardly into said lower section, said sludge trap having an upper section sequentially angling upwardly and downwardly between said inlet and said outlet thereby inhibiting the liquid flowing into said inlet to be urged to flow upwardly into said upper section, said sludge trap urging the liquid to flow upwardly into said upper section when said lower section becomes sufficiently filled with sludge, said inlet comprising a Y-fitting having an inlet arm and a pair of outlet arms branching away from said inlet arm, said inlet arm being fluidly coupled to the output of the septic tank having the output of the septic tank extending through said entry in said back wall of said vault, said outlet comprising a Y-fitting having a pair of inlet arms branching away from an outlet arm, said outlet arm being fluidly coupled to the leach field supply having the leach field supply extending through said exit in said front wall of said vault, said lower section comprising a first pipe being fluidly coupled to a respective one of said outlet arms associated with said inlet such that said first pipe angles downwardly from said respective outlet arm, said lower section including an elbow being fluidly coupled between said first pipe and a second pipe such that said second pipe angles upwardly from said first pipe, said lower section including a Y-fitting having an input arm and a pair of output arms branching away from said input arm, said second pipe being fluidly coupled to said input arm, said lower section including a third pipe being fluidly coupled between a respective one of said output arms associated with said lower section and a respective one of said inlet arms associated with said outlet, said lower section including a pump pipe being fluidly coupled to a respective one of said output arms associated with said lower section having said pump pipe angling upwardly toward said top wall of said vault and outwardly through said port in said top wall, said port having a bounding edge defining a circular shape being elongated along an axis extending between said front wall and said back wall of said vault such that said port has an ovoid shape thereby facilitating said pump pipe to be angled having said pump pipe extending outwardly through the ground thereby facilitating said pump pipe to be fluidly coupled to a pump truck for emptying the septic tank, said upper section including a primary pipe being fluidly coupled to a respective one of said outlet arms associated with said inlet such that said primary pipe angles upwardly from said respective outlet arm, said upper section including a central pipe being fluidly coupled to said primary pipe such that said central pipe is horizontally oriented, said upper section including a secondary pipe being fluidly coupled between said central pipe and a respective one of said inlet arms associated with said outlet, said central pipe having an alarm cup being integrated into said central pipe; and a flow alarm being integrated into said upper section of said sludge trap thereby facilitating said flow alarm to be actuated when said sludge trap urges the liquid to flow upwardly into said upper section, said flow alarm including an alert being conspicuously located thereby facilitating said alert to be visible to a user, said alert being turned on when said flow alarm is actuated wherein said alert is configured to alert the user that the septic tank needs to be emptied, said flow alarm being positioned in said alarm cup in said central pipe of said upper section, said flow alarm being actuated when fluid flows into said alarm cup, said flow alarm being normally de-actuated; and a light emitter having a housing being mounted in the conspicuous location and a lens being coupled to said housing such that said lens is exposed, said light emitter emitting light through said lens when said light emitter is turned on, said light emitter being electrically coupled to said flow alarm such that said light emitter defines said alert, said light emitter being turned on when said flow alarm is actuated, said light emitter being turned off when said flow alarm is de-actuated.

* * * * *